(12) United States Patent
Chu

(10) Patent No.: US 12,197,487 B2
(45) Date of Patent: Jan. 14, 2025

(54) DATABASE GENERATION METHOD AND APPARATUS, ELECTRONIC DEVICE AND MEDIUM

(71) Applicant: John Chu, Auckland (NZ)

(72) Inventor: John Chu, Auckland (NZ)

( * ) Notice: Subject to any disclaimer, the term of this patent is extended or adjusted under 35 U.S.C. 154(b) by 0 days.

(21) Appl. No.: 17/911,555

(22) PCT Filed: Jan. 28, 2022

(86) PCT No.: PCT/NZ2022/050012
§ 371 (c)(1),
(2) Date: Aug. 3, 2023

(87) PCT Pub. No.: WO2023/146417
PCT Pub. Date: Aug. 3, 2023

(65) Prior Publication Data
US 2024/0211506 A1    Jun. 27, 2024

(51) Int. Cl.
*G06F 16/383* (2019.01)
*G06V 30/148* (2022.01)
(Continued)

(52) U.S. Cl.
CPC .......... *G06F 16/383* (2019.01); *G06V 30/148* (2022.01); *G06V 30/293* (2022.01); *G09B 19/06* (2013.01)

(58) Field of Classification Search
CPC .. G06F 16/383; G06V 30/148; G06V 30/293; G09B 19/06
See application file for complete search history.

(56) References Cited

U.S. PATENT DOCUMENTS

| 2009/0299974 A1* | 12/2009 | Kataoka | G06F 16/90344 |
| 2014/0172410 A1* | 6/2014 | Lee | G06F 40/53 |
| | | | 704/2 |

(Continued)

FOREIGN PATENT DOCUMENTS

| CN | 102184383 A | 9/2011 |
| CN | 104765837 A | 7/2015 |

OTHER PUBLICATIONS

Lee et al. "A hierarchical model-guided generation of Chinese characters." Proceedings of the 12th IAPR International Conference on Pattern Recognition, vol. 3—Conference C: Signal Processing (Cot. No. 94CH3440-5). vol. 2 IEEE, 1994, Oct. 13, 1994 (Oct. 13, 1994) Retrieved on Apr. 4, 2022 (Apr. 4, 2022) from <https://ieeexplore.ieee.org/abstract/document/576915> entire document.

(Continued)

*Primary Examiner* — Huawen A Peng

(57) ABSTRACT

The present application provides a database generation method and apparatus, an electronic device and a medium. The method includes: acquiring an image of a Chinese character, determining, based on the image of the Chinese character, elementary components contained in the Chinese character and positions of the elementary components in the image of the Chinese character; determining position codes corresponding to the positions of the elementary components; and storing the elementary components and the corresponding position codes thereof in a corresponding manner to obtain a component library of a database. Thus, the difficulty of generating the database is reduced.

17 Claims, 7 Drawing Sheets

(51) Int. Cl.
*G06V 30/28* (2022.01)
*G09B 19/06* (2006.01)

(56) References Cited

U.S. PATENT DOCUMENTS

2016/0188538 A1* 6/2016 Xia ..................... G06F 40/129
 345/471
2019/0096034 A1* 3/2019 Niu ..................... G09B 19/06

OTHER PUBLICATIONS

Spitz. "Determination of the scipt and language content of document images." IEEE Transactions on Pattern Analysis and Machine Intelligence 19.3 (1997): 235-245. Mar. 1997 (Mar. 1997) Retrieved on Apr. 4, 2022 (Apr. 4, 2022) from <https://ieeexplore.ieee.org/abstract/document/584100> entire document.

Chao et al. "A robot calligraphy system: From simple to complex writing by human gestures." Engineering Applications of Artificial Intelligence 59 (2017): 1-14. Mar. 2017 (Mar. 2017) Retrieved on Apr. 4, 2022 (Apr. 4, 2022) from <https://www.sciencedirect.com/science/article/abs/pii/S0952197616302329> entire document.

International search report of PCT/NZ2022/050012.

* cited by examiner

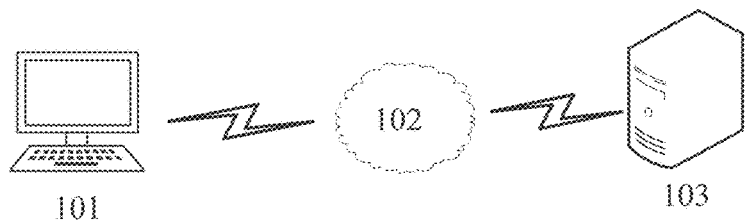
Fig. 1
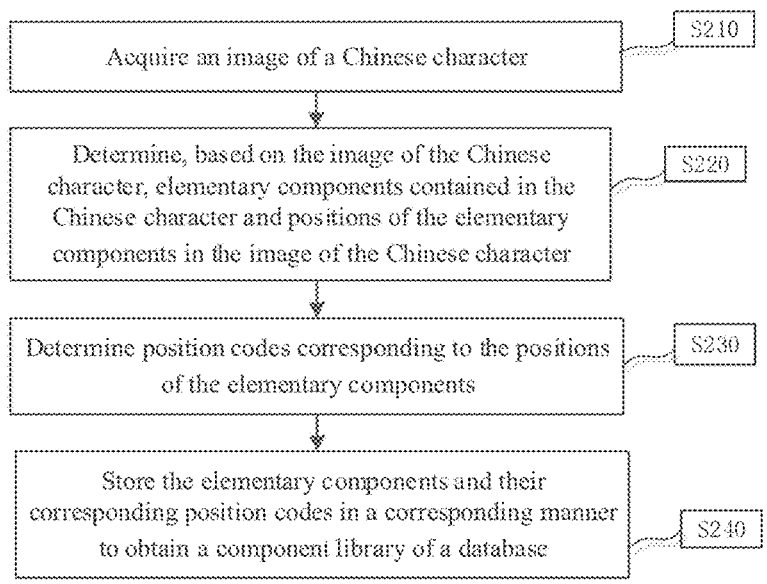
Fig. 2
| 1a | 1b |
|---|---|
| 1c | 1d |
Fig. 3
| 2a | 2b | 2c |
|---|---|---|
| 2d | 2e | 2f |
| 2g | 2h | 2i |
Fig. 4

| 3a | 3b | 3c | 3d |
|----|----|----|----|
| 3e | 3f | 3g | 3h |
| 3i | 3j | 3k | 3l |
| 3m | 3n | 3o | 3p |

Fig. 5

| 4a | 4b | 4c | 4d | 4e |
|----|----|----|----|----|
| 4f | 4g | 4h | 4i | 4j |
| 4k | 4l | 4m | 4n | 4o |
| 4p | 4q | 4r | 4s | 4t |
| 4u | 4v | 4w | 4x | 4y |

Fig. 6

| 5a | 5b | 5c | 5d | 5e | 5f |
|----|----|----|----|----|----|
| 5g | 5h | 5i | 5j | 5k | 5l |
| 5m | 5n | 5o | 5p | 5q | 5r |
| 5s | 5t | 5u | 5v | 5w | 5x |
| 5y | 5z | 5A | 5B | 5C | 5D |
| 5E | 5F | 5G | 5H | 5I | 5J |

Fig. 7

DATABASE GENERATION METHOD AND APPARATUS, ELECTRONIC DEVICE AND MEDIUM

TECHNICAL FIELD

The present application relates to the field of artificial intelligence, and in particular to a database generation method and apparatus, an electronic device and a medium.

BACKGROUND

Artificial intelligence is a branch of computer science and is considered as one of the three main cutting-edge technologies in the 21st century. In the past three decades, artificial intelligence has developed rapidly, and has been widely used in many fields, and achieved fruitful results.

The information retrieval technology in artificial intelligence can be used to retrieve Chinese characters, etc. Most Chinese character databases used in existing Chinese character retrieval methods depend on manual data entry, which requires entry staff having a good knowledge of Chinese characters.

SUMMARY

The present application aims to provide a database generation method and apparatus, an electronic device and a medium, which can reduce the difficulty of generating a Chinese character database to a certain extent.

According to one aspect of embodiments of the present application, there is provided a database generation method, including: acquiring an image of a Chinese character; determining, based on the image of the Chinese character, elementary components contained in the Chinese character and positions of the elementary components in the image of the Chinese character; determining position codes corresponding to the positions of the elementary components; and storing the elementary components and their corresponding position codes in a corresponding manner to obtain a component library of a database.

According to one aspect of embodiments of the present application, there is provided a database generation apparatus, including: an acquisition module configured to acquire an image of a Chinese character; a first determination module configured to determine, based on the image of the Chinese character, elementary components contained in the Chinese character and positions of the elementary components in the image of the Chinese character; a second determination module configured to determine position codes corresponding to the positions of the elementary components; and a storage module configured to store the elementary components and their corresponding position codes in a corresponding manner to obtain a component library of a database.

In one embodiment of the present application, based on the foregoing scheme, after acquiring the image of the Chinese character, the acquisition module is configured to: acquire a structure of the Chinese character; store the structure of the Chinese character in a structure library of the database; and store the Chinese character in a Chinese character library of the database.

In one embodiment of the present application, based on the foregoing scheme, the first determination module is configured to: segment the image of the Chinese character to obtain a plurality of Chinese character image segments; identify elementary components corresponding to the Chinese character image segments; and take the elementary components corresponding to the plurality of Chinese character image segments as the elementary components contained in the Chinese character.

In one embodiment of the present application, based on the foregoing scheme, the second determination module is configured to: determine a position map corresponding to the Chinese character based on the positions of the elementary components in the image of the Chinese character, the position map containing a plurality of structural positions, and the position codes being provided corresponding to the structural positions in the position map; determine structural positions of the elementary components in the position map based on the positions of the elementary components in the image of the Chinese character; and take the position codes of the structural positions corresponding to the elementary components as the position codes of the positions corresponding to the elementary components.

In one embodiment of the present application, based on the foregoing scheme, the second determination module is configured to: determine a map code of the position map before determining the position map corresponding to the Chinese character; determine distinguishing codes of the position map for distinguishing the structural positions; and combine the map code with the distinguishing codes corresponding to the structural positions to obtain the position codes corresponding to the structural positions.

In one embodiment of the present application, based on the foregoing scheme, the position map is a square array diagram, and the second determination module is configured to: acquire the number of rows or columns of the square array, and subtract one from the number of rows or columns to obtain the map code; and according to a sequence of the structural positions, encode the structural positions with letters as the distinguishing codes of the structural positions.

In one embodiment of the present application, based on the foregoing scheme, the apparatus further includes a retrieval module configured to: acquire a target stroke, retrieve candidate components containing the target stroke from the component library, and display the candidate components; in response to a component selection instruction to select a target component from the candidate components, display the target component, and display at least one position selection button for selecting a position of the target component; in response to a position selection instruction to select the position of the target component received through the at least one position selection button, retrieve a target structure containing the position of the target component from the structure library, retrieve candidate characters having the target structure and with the target component at the position of the target component from the Chinese character library, and display the candidate characters; and in response to a character selection instruction to select from the candidate characters a character to be retrieved, retrieve the character to be retrieved.

In one embodiment of the present application, based on the foregoing scheme, the retrieval module is configured to: in response to a retrieval instruction, acquire basic strokes and display the basic strokes; and in response to a stroke selection instruction to select the target stroke from the basic strokes, acquire the target stroke, and search in the component library by using position codes corresponding to the candidate components containing the target stroke to obtain the candidate components containing the target stroke; and display the candidate components.

In one embodiment of the present application, based on the foregoing scheme, the apparatus further includes a learning module configured to: acquire a character to be learned, and retrieve a target structure corresponding to the character to be learned from the structure library based on the character to be learned; display the character to be learned, and display a character structure diagram corresponding to the target structure, the character structure diagram being configured to represent positions of a plurality of components of the character to be learned; in response to a component selection instruction received through the character structure diagram, retrieve a component to be learned corresponding to the component selection instruction from the component library, and retrieve a component explanation corresponding to the component to be learned; and display the component to be learned and the component explanation corresponding to the component to be learned.

In one embodiment of the present application, based on the foregoing scheme, the learning module is configured to: in response to a component look-up instruction, acquire a structure code corresponding to each component position in the character structure diagram; and in response to a component selection instruction received through the structure code, determine the component to be learned corresponding to the component selection instruction, and retrieve the component to be learned corresponding to the component selection instruction from the component library.

In one embodiment of the present application, based on the foregoing scheme, the apparatus further includes a game module configured to: acquire a character structure diagram and characters to be selected; display the character structure diagram and the characters to be selected; in response to a character selection instruction to select from the characters to be selected a result character, mark the result character corresponding to the character selection instruction, and display the result character in the character structure diagram; and compare the result character with a standard character to obtain and display a comparison result.

In one embodiment of the present application, based on the foregoing scheme, the game module is configured to: retrieve a structural position corresponding to the result character from the structure library; compare the structural position with the character structure diagram; and determine the comparison result as correct if the structural position corresponds to the character structure diagram, and wrong if the structural position does not correspond to the character structure diagram.

According to one aspect of embodiments of the present application, there is provided a computer-readable program medium, which stores computer program instructions that, when executed by a computer, cause the computer to perform any of the methods described above.

According to one aspect of embodiments of the present application, there is provided an electronic device, including: a processor; a memory storing computer-readable instructions which, when executed by the processor, enable implementation of the method as described in any one of the above embodiments.

According to one aspect of embodiments of the present application, there is provided a computer program product or computer program including computer instructions stored in a computer-readable storage medium. The processor of the computer device reads the computer instructions from the computer-readable storage medium, and the processor executes the computer instructions to cause the computer device to carry out the methods provided in the various alternative embodiments described above.

The technical scheme provided by the embodiments of the present application may have the following beneficial effects:

In the technical scheme provided by some embodiments of the present application, by acquiring an image of a Chinese character; determining, based on the image of the Chinese character, elementary components contained in the Chinese character and positions of the elementary components in the image of the Chinese character; determining position codes corresponding to the positions of the elementary components; and storing the elementary components and their corresponding position codes in a corresponding manner to obtain a component library of a database, the components can be stored in a computer and retrieved through the codes, so that the database can be automatically generated without manual entry, which reduces the difficulty of generating the database.

It is to be understood that the foregoing general description and the following detailed description are exemplary only and do not limit the present application.

BRIEF DESCRIPTION OF DRAWINGS

The accompanying drawings, which are incorporated into and constitute a part of the specification, illustrate embodiments consistent with the present application and, together with the description, serve to explain the principles of the present application.

FIG. 1 shows a diagram of an exemplary system architecture to which the technical scheme of the embodiments of the present application can be applied;

FIG. 2 schematically shows a flowchart of a database generation method according to an embodiment of the present application;

FIGS. 3-7 schematically show position maps according to an embodiment of the present application;

DETAILED DESCRIPTION

Figure 8:
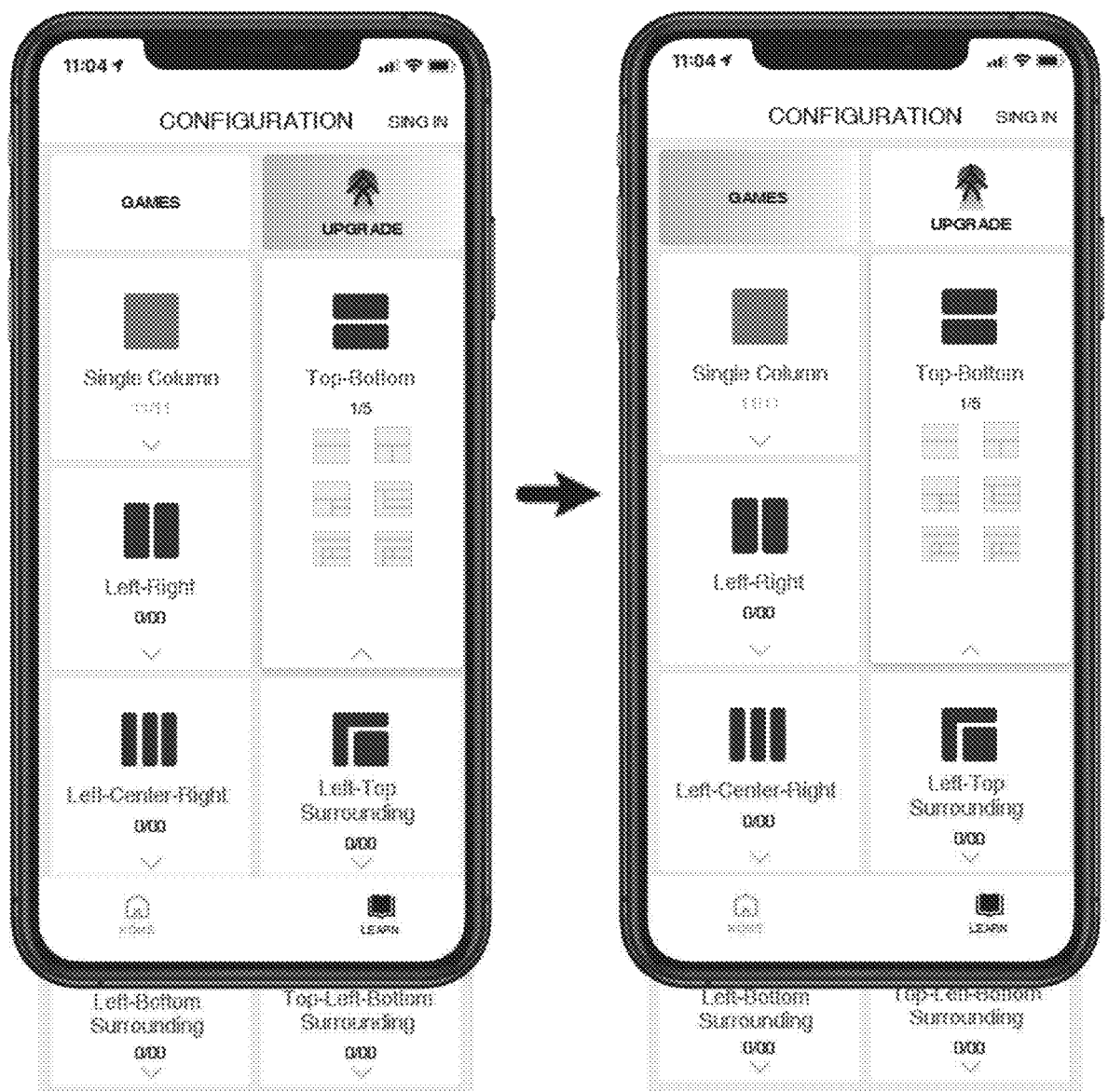
FIG. 8 schematically shows a diagram of a character retrieval display interface according to an embodiment of the present application.

Exemplary embodiments will now be described more fully with reference to the accompanying drawings. However, exemplary embodiments can be implemented in many forms and should not be construed as being limited to the examples set forth herein; on the contrary, these embodiments are provided to make the present application more comprehensive and complete, and to fully convey the concept of the example embodiments to those skilled in the art.

In addition, the described features, structures, or characteristics may be combined in any suitable manner in one or more embodiments. In the following description, numerous specific details are provided to give a thorough understanding of the embodiments of the present application. However, those skilled in the art will realize that the technical scheme of the present application can be practiced without one or more of the specific details, or with other methods, components, devices, steps, etc. In other cases, well-known methods, devices, implementations or operations are not shown or described in detail to avoid obscuring aspects of the present application.

The block diagrams shown in the drawings are only functional entities and do not necessarily correspond to physically separate entities. That is, these functional entities can be implemented in the form of software, or in one or more hardware modules or integrated circuits, or in different networks and/or processor devices and/or microcontroller devices.

The flowchart shown in the drawings is only an exemplary illustration, and does not necessarily include all contents and operations/steps, nor do the operations/steps have to be executed in the described order. For example, some operations/steps can be decomposed, while some operations/steps can be combined or partially combined, so the actual execution order may change according to the actual situation.

FIG. 1 shows a diagram of an exemplary system architecture 100 to which the technical scheme of the embodiments of the present application can be applied.

As shown in FIG. 1, the system architecture 100 may include a client 101, a network 102 and a server 103. The network 102 is a medium for providing a communication link between the client 101 and the server 103. The network 102 may have various connection types, such as a wired communication link and a wireless communication link, which is not limited herein.

It should be understood that the number of clients 101, the number of networks 102 and the number of servers 103 in FIG. 1 are only schematic. There may be any number of the client(s) 101, network(s) 102 and server(s) 103 according to implementation requirements. For example, the server 103 may be an independent physical server, a server cluster composed of multiple physical servers or a distributed system, or may be a cloud server which provides basic cloud computing services such as cloud services, cloud databases, cloud computing, cloud functions, cloud storage, network services, cloud communication, middleware services, domain name services, security services, content delivery networks (CDN), and big data and artificial intelligence platforms. The client 101 may be a smart phone, a tablet computer, a laptop computer, a desktop computer, a smart speaker, a smart watch, a robot, etc., but is not limited thereto.

In one embodiment of the present application, the client 101 acquires an image of a Chinese character; determines, based on the image of the Chinese character, elementary components contained in the Chinese character and positions of the elementary components in the image of the Chinese character; determines position codes corresponding to the positions of the elementary components; and stores the elementary components and their corresponding position codes in a corresponding manner to obtain a component library of a database, and thus the components can be stored in a computer and retrieved through the codes, so that the database can be automatically generated without manual entry, which reduces the difficulty of generating the database.

In one embodiment of the present application, the server 103 acquires an image of a Chinese character uploaded by the client 101, determines, based on the image of the Chinese character, elementary components contained in the Chinese character and positions of the elementary components in the image of the Chinese character; determines position codes corresponding to the positions of the elementary components; and stores the elementary components and their corresponding position codes in a corresponding manner to obtain a component library of a database, and thus the components can be stored in a computer and retrieved through the codes, so that the database can be automatically generated without manual entry, which reduces the difficulty of generating the database.

It should be noted that the database generation method provided by the embodiment of the present application is generally executed by the client 101, and correspondingly, a database generation apparatus is generally installed in the client 101. However, in a further embodiment of the present application, the server 103 may also have similar functions as the client 101, so as to execute the database generation method provided by the embodiments of the present application.

The implementation details of the technical scheme of the embodiment of the present application are described in detail below:

FIG. 2 schematically shows a flowchart of a database generation method according to an embodiment of the present application. An executing subject of the database generation method may be a server, such as the client 101 shown in FIG. 1.

Referring to FIG. 2, the database generation method at least includes steps S210 to S240, which are described in detail as follows.

At step S210, an image of a Chinese character is acquired.

In one embodiment of the present application, characters may be English words, Chinese characters, Mongolian characters, etc.

In one embodiment of the present application, the image of the Chinese character may be acquired by a terminal which executes the database generation method, or transmitted to the terminal which executes the database generation method after being acquired by other terminals. The acquisition method may be photo taking, optical character recognition, etc.

In step S220, based on the image of the Chinese character, elementary components contained in the Chinese character are determined, and positions of the elementary components in the image of the Chinese character are determined.

In one embodiment of the present application, the image of the Chinese character may be segmented to obtain a plurality of Chinese character image segments; elementary components corresponding to the Chinese character image segments are identified; and the elementary components corresponding to the plurality of Chinese character image segments are taken as the elementary components contained in the Chinese character.

In one embodiment of the present application, segmentation may be conducted based on the continuity between strokes in the image. In a further embodiment of the present application, segmentation may be conducted according to the radicals of the Chinese character.

In one embodiment of the present application, elementary components contained in the image segments may be taken as elementary components corresponding to the Chinese character image segments, that is, the elementary components may be identified based on the continuity between strokes. In a further embodiment of the present application, the elementary components may be radicals, and radicals contained in the image segments may be taken as elementary components corresponding to the Chinese character image segments.

In one embodiment of the present application, a position of an elementary component in the image of the Chinese character may be determined according to a position of an image segment in the image of the Chinese character, for example, when an image segment is at the first position from the left, it can be determined that the position of the elementary component corresponding to the image segment is left-top.

In one embodiment of the present application, a position of an elementary component in the image of the Chinese character may be determined according to a position of an image segment in the image of the Chinese character and the number of image segments at each position, for example, if there are three image segments on the left of the image of the Chinese character, the position of the elementary component at the second position from the left is left-center; and if there are four image segments on the left of the image of the Chinese character, the position of the elementary component at the second position from the left is left-top-center.

Referring to FIG. 2 still, in step S230, position codes corresponding to the positions of the elementary components are determined.

In one embodiment of the present application, the position codes corresponding to the positions of the elementary components may be preset manually.

In one embodiment of the present application, a position map corresponding to the Chinese character may be determined based on the positions of the elementary components in the image of the Chinese character, the position map containing a plurality of structural positions, and the position codes being provided corresponding to the structural positions in the position map; structural positions of the elementary components in the position map are determined based on the positions of the elementary components in the image of the Chinese character; and the position codes of the structural positions corresponding to the elementary components are taken as the position codes of the positions corresponding to the elementary components.

In one embodiment of the present application, a map code of the position map may also be determined before determining the position map corresponding to the Chinese character; distinguishing codes of the position map for distinguishing the structural positions are determined; and the map code is combined with the distinguishing codes corresponding to the structural positions to obtain the position codes corresponding to the structural positions.

In one embodiment of the present application, the position map may be a square array diagram, the number of rows or columns of the square array may be acquired, and the map code is obtained by subtracting one from the number of rows or columns. For example, if the position map is a square array with 2 rows and 2 columns, the map code may be 1; and if the position map is a square array with 4 rows and 4 columns, the map code may be 3. In one embodiment of the present application, the structural positions may be encoded with letters according to a sequence of the structural positions as the distinguishing codes of the structural positions. For example, from left to right, the structural positions are encoded row by row with letters a, b, c, d, etc. as the distinguishing codes of the structural positions. Then, the position codes obtained by combining the map code with the distinguishing codes are: 1a, 1b, 1e, 1d or 4a, 4b, 4c, 4d . . . 4y, as shown in FIGS. 3-7, which schematically show position maps according to an embodiment of the present application.

In step S240, the elementary components and their corresponding position codes are stored in a corresponding manner to obtain a component library of a database.

In one embodiment of the present application, a structure of the Chinese character may be acquired, such as a left-right structure, a front-back structure, a front-center-back structure and a top-bottom structure, and then the structure of the Chinese character is stored in a structure library of the database; and the Chinese character is stored in a Chinese character library of the database.

In one embodiment of the present application, the structure of the Chinese character may be determined based on the positions of the elementary components.

In the embodiment shown in FIG. 2, by acquiring an image of a Chinese character; determining, based on the image of the Chinese character, elementary components contained in the Chinese character and positions of the elementary components in the image of the Chinese character; determining position codes corresponding to the positions of the elementary components; and storing the elementary components and their corresponding position codes in a corresponding manner to obtain a component library of a database, the components can be stored in a computer and retrieved through the codes, so that the database can be automatically generated without manual entry, which reduces the difficulty of generating the database.

In one embodiment of the present application, further, a target stroke may be acquired, candidate components containing the target stroke are retrieved from a component library, and the candidate components are displayed; in response to a component selection instruction to select a target component from the candidate components, the target component is displayed, and at least one position selection button for selecting a position of the target component is displayed; in response to a position selection instruction to select the position of the target component received through the at least one position selection button, a target structure containing the position of the target component is retrieved from the structure library, candidate characters having the target structure and with the target component at the position of the target component are retrieved from the Chinese character library, and the candidate characters are displayed; and in response to a character selection instruction to select from the candidate characters a character to be retrieved, the character to be retrieved is retrieved, as shown in FIG. 8, which schematically shows a diagram of a character retrieval interface according to an embodiment of the present application.

In one embodiment of the present application, the target stroke may be input by the user in the client 101, for example, the target stroke may be input by handwriting. The component may be the same as the stroke or a combination of multiple strokes. The component may be determined based on continuity, that is, strokes connected together may be determined as one component, so that users can easily use the method even if without having a good knowledge of radicals. In a further embodiment of the present application, the component may be a radical.

Figure 9:
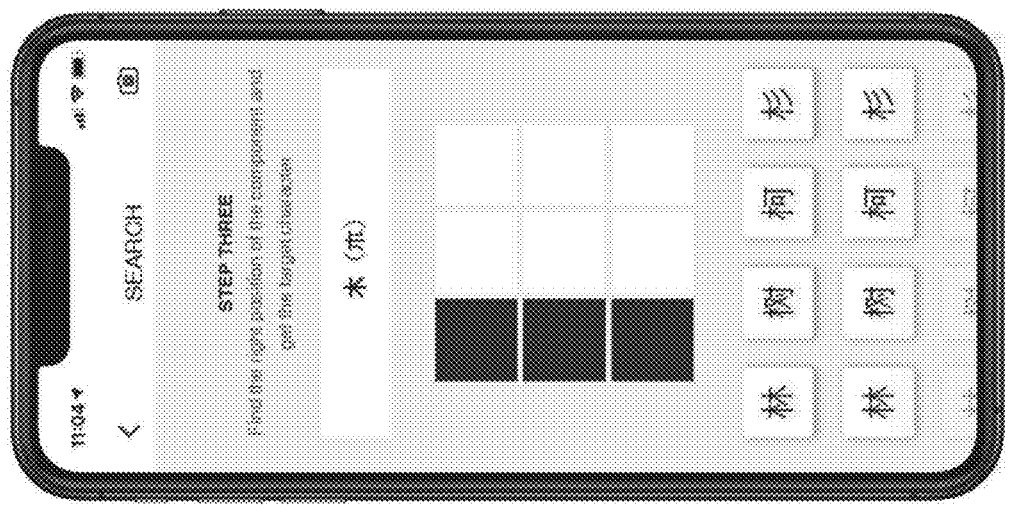
FIG. 9 schematically shows a diagram of a character retrieval interface according to an embodiment of the present application.
Figure 9:
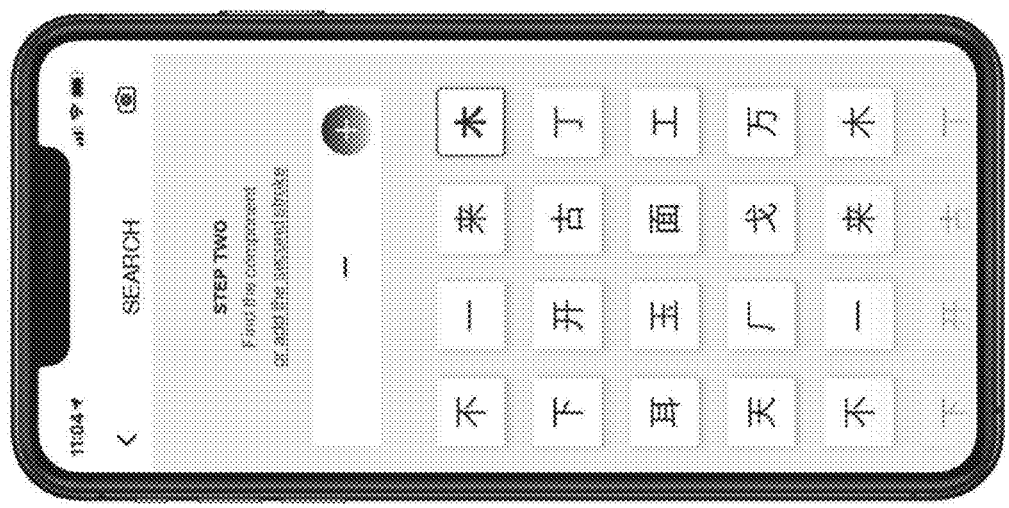
Figure 9:
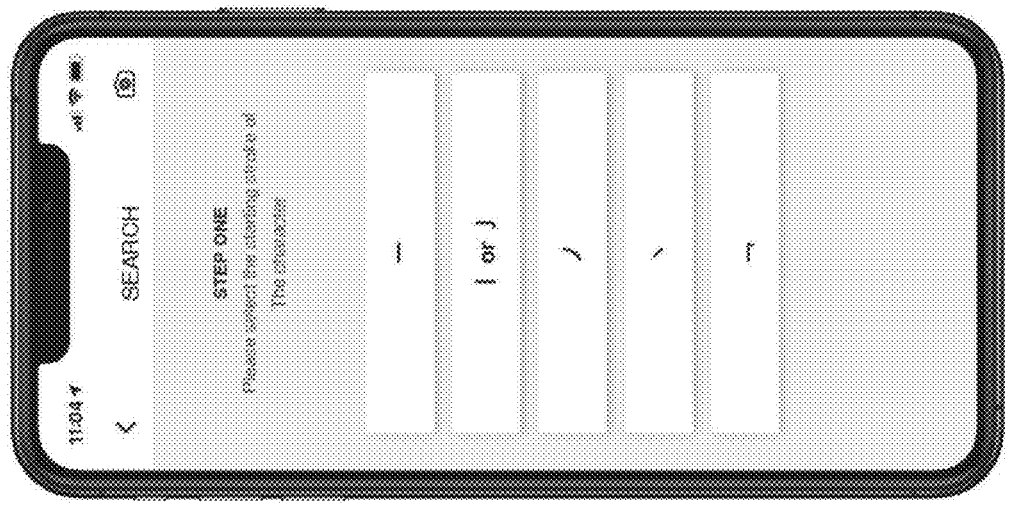

In one embodiment of the present application, in response to a retrieval instruction. basic strokes may be acquired and displayed; and in response to a stroke selection instruction to select the target stroke from the basic strokes, the target stroke is acquired, and search is conducted in the component library by using position codes corresponding to the candidate components containing the target stroke to obtain the candidate components containing the target stroke; and the candidate components are displayed. The retrieval instruction may be input in an interface shown in FIG. 9 which schematically shows a diagram of terminal interface switching involved in a character retrieval method according to an embodiment of the present application. By tapping the GAMES button in the left figure of FIG. 8 which becomes darker after being selected, the interface in the right figure of FIG. 8 is presented, which confirms that the user has input the retrieval instruction.

In one embodiment of the present application, the basic strokes may be preset. For example, when the character to be retrieved is a Chinese character, the basic strokes may include: a dot stroke ( ˋ ), a horizontal stroke ( — ), a vertical stroke ( | ), a left-falling stroke ( ノ ), a right-falling stroke ( ㇏ ), a rising stroke ( ) etc. In a further embodiment of the present application, the preset basic strokes may alternatively be a dot stroke ( ˋ ), a horizontal stroke ( — ), a vertical stroke ( | ) or a vertical-J hook stroke ( ㇅ ), a left-falling stroke ( ノ ), and a horizontal-J hook stroke ( ⁀ ).

In one embodiment of the present application, the target stroke and the basic strokes may be identified from the character to be retrieved.

In one embodiment of the present application, a Chinese character image of the character to be retrieved may be acquired; segment the Chinese character image to obtain a plurality of image segments; acquire a stroke in each image segment at a given position; and the basic strokes are determined based on the strokes at the given positions, wherein the position may include: the whole image, top, bottom, left, right, center, outside, left-top, right-top, left-bottom and right-bottom.

In one embodiment of the present application, the character may be segmented based on the continuity between strokes. The stroke at the left-top, left or top of the image segment may be taken as the stroke at the given position. Stroke acquisition may be conducted in the order of left-top, left and top. That is, the stroke at the left-top may be acquired first; if the acquisition fails, the stroke at the left is to be acquired; and if the acquisition fails, the stroke at the top is to be acquired. The strokes in the image segments at the given positions may be taken as the basic strokes. In a further embodiment of the present application, a starting stroke in an image segment at a given image position in the Chinese character image and preset strokes related to the starting stroke may be taken as the basic strokes. For example, when the starting stroke in the segment image at the given image position in the Chinese character image is a horizontal stroke ( — ), the preset strokes related to the starting stroke may include: a dot stroke ( ˋ ), a vertical stroke ( | ) or a vertical-J hook stroke ( ㇅ ), a left-falling stroke ( ノ ), and a horizontal-J hook stroke ( ⁀ ).

In one embodiment of the present application, the basic strokes may be displayed in a stroke display page to prompt the user to select the target stroke from the basic strokes. The basic strokes displayed in the stroke display page may be changeable. If a stroke change instruction instead of the stroke selection instruction is received, the basic strokes can be replaced with alternative basic strokes. The stroke change instruction may be to swipe horizontally or vertically on the page.

In one embodiment of the present application, the candidate components may be retrieved in response to the stroke selection instruction received through the stroke display page; and the stroke selection page may be switched to the component selection page, the candidate components are displayed in the component selection page, and the user is prompted to finish stroke selection and start component selection through the page switching. The candidate components in the component selection page may also be changeable, so that all candidate components in one component selection page can be displayed. The candidate components may be changed in response to a component change instruction.

In one embodiment of the present application, candidate components with the target stroke as the starting stroke may be retrieved. In this way, the number of components acquired may be greatly reduced compared with acquiring all components containing the target stroke, so that the selection of the target component can be accelerated.

In one embodiment of the present application, a position of the target stroke in the candidate component may be selected, so as to determine the candidate component according to both the target stroke and the position of the target stroke.

In one embodiment of the present application, if no candidate component is found, the target stroke is taken as the character to be retrieved; and if no candidate character is found, the target component is taken as the character to be retrieved.

In one embodiment of the present application, in response to the component selection instruction received through the component selection page, the component selection page may be switched to a character selection page, so that the user is prompted to select characters through the page switching, and the target component and the position selection buttons are displayed in the character selection page.

In one embodiment of the present application, when switching to the character selection page, the position selection buttons which receive a selected preset position may be set at the same time; when displaying the character selection page, the preset position may be acquired, preset characters with the target component at the preset position are retrieved, and the preset characters are displayed in the character selection page; and in response to the position selection instruction to select the target position at the position selection buttons, the candidate characters with the target component at the target position are retrieved, and in the character selection page, the preset characters are replaced with the candidate characters.

In one embodiment of the present application, there may be more than one position selection button; after acquiring the preset position, one or more position selection buttons corresponding to the preset position may be marked in the character selection page; and after acquiring the position selection instruction, the one or more position selection buttons corresponding to the preset position are unmarked in the character selection page, and one or more position selection buttons corresponding to the position selection instruction are marked. Marking may be realized by differentiated display, for example, the marked button may be highlighted.

In one embodiment of the present application, one or more position selection buttons selected in the character selection page according to the position selection instruction may be acquired as the one or more position selection buttons corresponding to the position selection instruction; and a position of the one or more position selection buttons corresponding to the position selection instruction in the plurality of position selection buttons may be acquired as the target position, for example, when a button located at the "top" in the plurality of position selection buttons is selected, the target position may be determined as "top".

In one embodiment of the present application, the number of the position selection buttons is at least nine, and the position selection buttons are arranged into a square array. For example, when there are nine position selection buttons, the nine position selection buttons are arranged into a 3×3 square array to represent "inside", "center" and "outside". In this way, many positions may be represented.

In one embodiment of the present application, the target position may be acquired by fuzzy matching. If there are nine position selection buttons, when the position selection buttons in the first column from the left are selected, the target position may be left or left-center, so that more potential candidate characters may be acquired.

In one embodiment of the present application, if a stroke adding instruction is received, retrieve next candidate strokes in the same component as the target stroke, and display the next candidate strokes; in response to a next stroke selection instruction to select a next target stroke from the next candidate strokes, acquire the next target stroke, and retrieve candidate components containing the target stroke and the next target stroke; and the target stroke and the next target stroke are displayed, and the candidate components containing the target stroke and the next target stroke are displayed, which further reduces the number of the candidate components acquired, thus accelerating the retrieval speed.

In one embodiment of the present application, before responding to the next stroke selection instruction, in response to the stroke adding instruction received through a stroke adding button, the target stroke may be moved away from a reserved position for displaying the next target stroke in a stroke display area; in response to the next stroke selection instruction, the target stroke is displayed in the stroke display area, and the next target stroke is displayed at the reserved position in the stroke display area, so that strokes in the stroke display area can be displayed at proper positions, for example, when there is only the target stroke in a stroke selection area, the target stroke may be located in the center of the stroke display area; and when responding to the next stroke selection instruction, the target stroke is moved from the center to one side, such as the left side, and half of the stroke display area of another layer is taken as the reserved position of the next target stroke, and so on, in response to each stroke adding instruction, one stroke may be added, and the strokes are arranged in the stroke display area according to a stroke selection order, so that the user can quickly retrieve the character.

In one embodiment of the present application, if a component adding instruction is received, acquire a target stroke of a next component, retrieve next candidate components containing the target stroke of the next component, and display the next candidate components; in response to a component selection instruction to select a next target component from the next candidate components, display the next target component, and display at least one position selection button for selecting a position of the next target component; and in response to a position selection instruction to select the position of the next target component received through the at least one position selection button, acquire a next target position corresponding to the position selection instruction, retrieve candidate characters with the target component at the target position and the next target component at the next target position, and display the candidate characters, wherein for the process of retrieving the next target component, one can refer to the process of retrieving the target component.

In one embodiment of the present application, if no candidate character is found, the target component is taken as the character to be retrieved.

Figure 10:
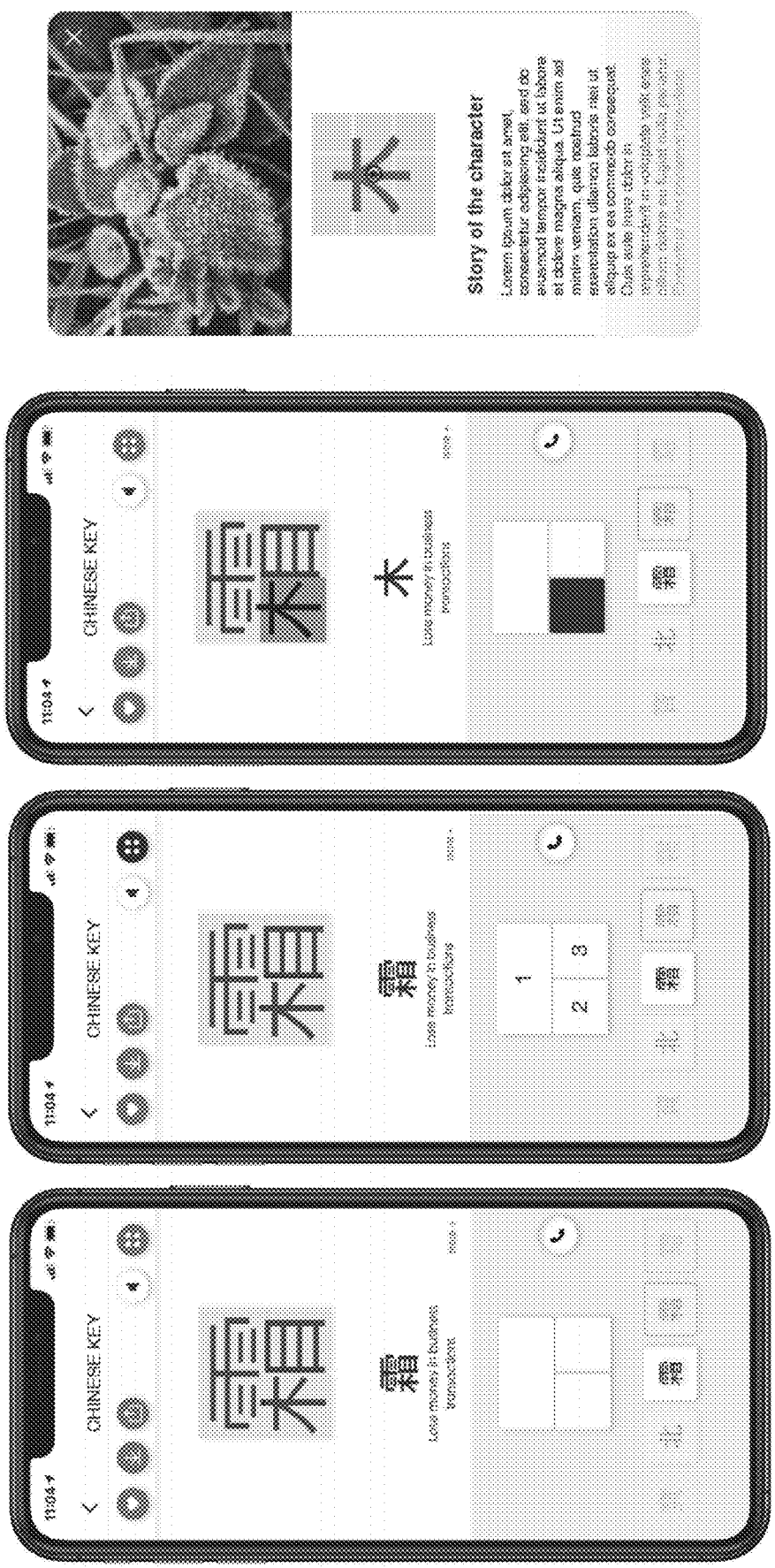
FIG. 10 schematically shows a diagram of a character learning interface according to an embodiment of the present application.

In one embodiment of the present application, character learning may also be conducted by using the database, where a character to be learned may be acquired, and a target structure corresponding to the character to be learned is retrieved from the structure library based on the character to be learned; the character to be learned is displayed, and a character structure diagram corresponding to the target structure is displayed, the character structure diagram being configured to represent positions of a plurality of components of the character to be learned; in response to a component selection instruction received through the character structure diagram, a component to be learned corresponding to the component selection instruction is retrieved from the component library, and a component explanation corresponding to the component to be learned is retrieved; and the component to be learned and the component explanation corresponding to the component to be learned are displayed, as shown in FIG. 10, which schematically shows a diagram of a character learning interface according to an embodiment of the present application.

In one embodiment of the present application, in response to a component look-up instruction, a structure code corresponding to each component position in the character structure diagram may be acquired; and in response to a component selection instruction received through the structure code, the component to be learned corresponding to the component selection instruction is determined, and the component to be learned corresponding to the component selection instruction is retrieved from the component library.

In one embodiment of the present application, a character game may also be played with the database, where a character structure diagram and characters to be selected may be acquired; the character structure diagram and the characters to be selected are displayed; in response to a character selection instruction to select from the characters to be selected a result character, the result character corresponding to the character selection instruction is marked, and the result character is displayed in the character structure diagram; and the result character is compared with a standard character to obtain and display a comparison result.

Figure 11:
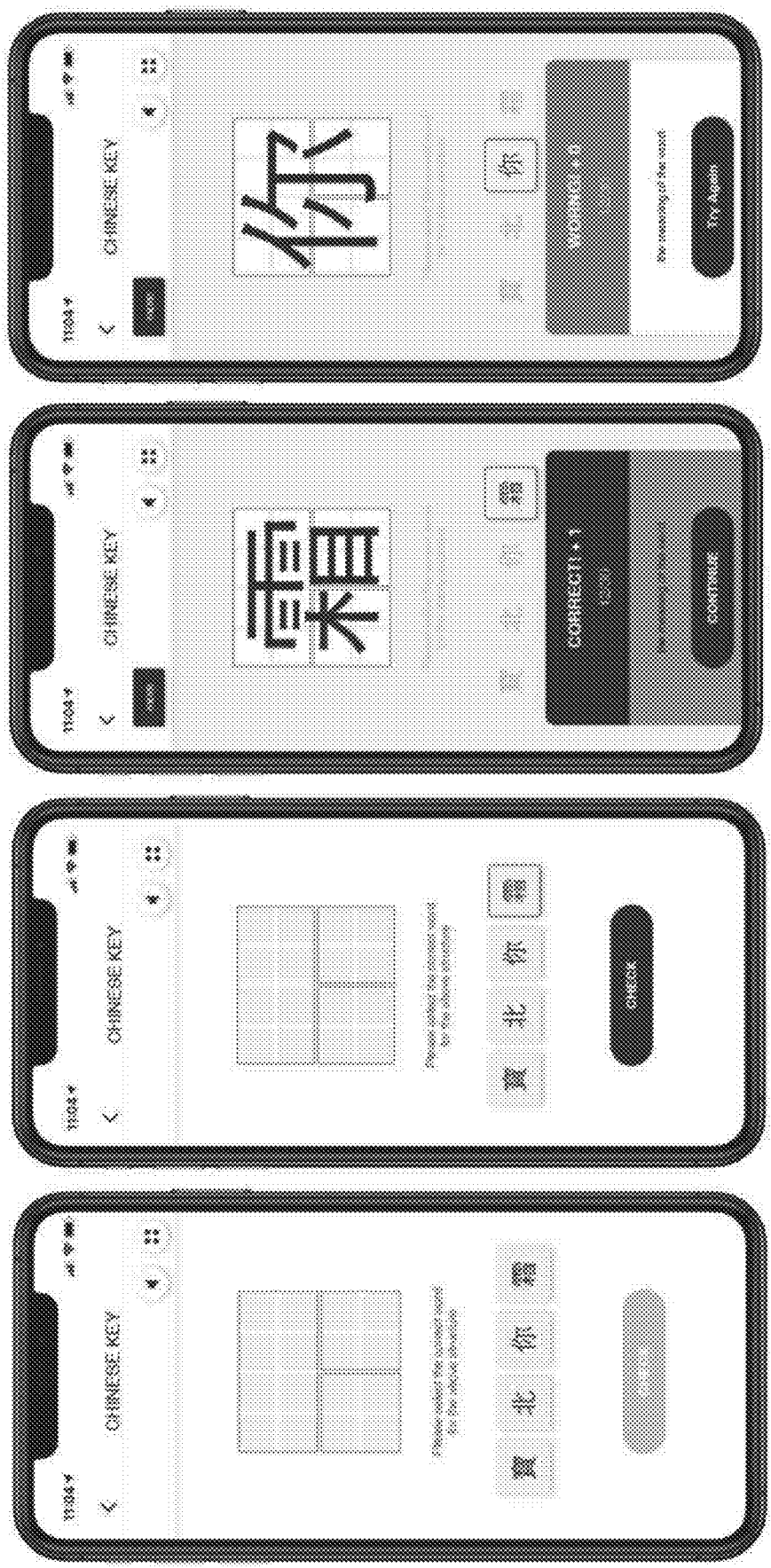
FIG. 11 schematically shows a diagram of a character game interface according to an embodiment of the present application.

In one embodiment of the present application, a result structure corresponding to the result character may be retrieved from the structure library; the result position is compared with the character structure diagram; and the comparison result is determined as correct if the structural position corresponds to the character structure diagram, and wrong if the structural position does not correspond to the character structure diagram, as shown in FIG. 11, which schematically shows a diagram of a character game interface according to an embodiment of the present application.

The apparatus embodiments of the present application will be described below. which can be used to carry out the database generation method in the above embodiments of the present application. For details not disclosed in the apparatus embodiments of the present application. please refer to the embodiments of the database generation method described above.

Figure 12:
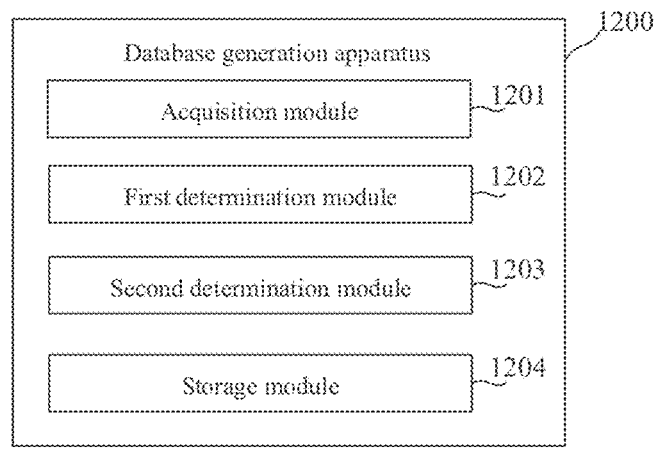
FIG. 12 schematically shows a block diagram of a database generation apparatus according to an embodiment of the present application.

FIG. 12 schematically shows a block diagram of a database generation apparatus according to an embodiment of the present application.

Referring to FIG. 12, a database generation apparatus 1200 according to one embodiment of the present application includes an acquisition module 1201, a first determination module 1202, a second determination module 1203 and a storage module 1204.

According to one aspect of embodiments of the present application, based on the foregoing scheme, the acquisition module 1201 is configured to acquire an image of a Chinese character; the first determination module 1202 is configured to determine, based on the image of the Chinese character, elementary components contained in the Chinese character and positions of the elementary components in the image of the Chinese character; the second determination module 1203 is configured to determine position codes corresponding to the positions of the elementary components; and the storage module 1201 is configured to store the elementary components and their corresponding position codes in a corresponding manner to obtain a component library of a database.

In one embodiment of the present application, based on the foregoing scheme, after acquiring the image of the Chinese character, the acquisition module 1201 is further configured to: acquire a structure of the Chinese character; store the structure of the Chinese character in a structure library of the database; and store the Chinese character in a Chinese character library of the database.

In one embodiment of the present application, based on the foregoing scheme, the first determination module 1202 is configured to: segment the image of the Chinese character to obtain a plurality of image segments; identify elementary components corresponding to the Chinese character image segments; and take the elementary components corresponding to the plurality of Chinese character image segments as the elementary components contained in the Chinese character.

In one embodiment of the present application, based on the foregoing scheme, the second determination module 1203 is configured to: determine a position map corresponding to the Chinese character based on the positions of the elementary components in the image of the Chinese character, the position map containing a plurality of structural positions, and the position codes being provided corresponding to the structural positions in the position map; determine structural positions of the elementary components in the position map based on the positions of the elementary components in the image of the Chinese character; and take the position codes of the structural positions corresponding to the elementary components as the position codes of the positions corresponding to the elementary components.

In one embodiment of the present application, based on the foregoing scheme, the second determination module 1203 is configured to: determine a map code of the position map before determining the position map corresponding to the Chinese character; determine distinguishing codes of the position map for distinguishing the structural positions; and combine the map code with the distinguishing codes corresponding to the structural positions to obtain the position codes corresponding to the structural positions.

In one embodiment of the present application, based on the foregoing scheme, the position map is a square array diagram, and the second determination module 1203 is configured to: acquire the number of rows or columns of the square array, and subtract one from the number of rows or columns to obtain the map code; and according to a sequence of the structural positions, encode the structural positions with letters as the distinguishing codes of the structural positions.

In one embodiment of the present application, based on the foregoing scheme, the apparatus further includes: a retrieval module configured to: acquire a target stroke, retrieve candidate components containing the target stroke from a component library, and display the candidate components; in response to a component selection instruction to select a target component from the candidate components, display the target component, and display at least one position selection button for selecting a position of the target component; in response to a position selection instruction to select the position of the target component received through the at least one position selection button, retrieve a target structure containing the position of the target component from the structure library, retrieve candidate characters having the target structure and with the target component at the position of the target component from the Chinese character library, and display the candidate characters; and in response to a character selection instruction to select from the candidate characters a character to be retrieved, retrieve the character to be retrieved.

In one embodiment of the present application, based on the foregoing scheme, the retrieval module is configured to: in response to a retrieval instruction, acquire basic strokes and display the basic strokes; in response to a stroke selection instruction to select the target stroke from the basic strokes, acquire the target stroke, and search in the component library by using position codes corresponding to the candidate components containing the target stroke to obtain the candidate components containing the target stroke; and display the candidate components.

In one embodiment of the present application, based on the foregoing scheme, the apparatus further includes a learning module configured to: acquire a character to be learned, and retrieve a target structure corresponding to the character to be learned from the structure library based on the character to be learned; display the character to be learned, and display a character structure diagram corresponding to the target structure, the character structure diagram being configured to represent positions of a plurality of components of the character to be learned; in response to a component selection instruction received through the character structure diagram, retrieve a component to be learned corresponding to the component selection instruction from the component library, and retrieve a component explanation corresponding to the component to be learned; and display the component to be learned and the component explanation corresponding to the component to be learned.

In one embodiment of the present application, based on the foregoing scheme, the learning module is configured to: in response to a component look-up instruction, acquire a structure code corresponding to each component position in the character structure diagram; and in response to a component selection instruction received through the structure code, determine the component to be learned corresponding to the component selection instruction, and retrieve the component to be learned corresponding to the component selection instruction from the component library.

In one embodiment of the present application, based on the foregoing scheme, the apparatus further includes a game module configured to: acquire a character structure diagram and characters to be selected; display the character structure diagram and the characters to be selected; in response to a character selection instruction to select from the characters to be selected a result character, mark the result character corresponding to the character selection instruction, and display the result character in the character structure diagram; and compare the result character with a standard character to obtain and display a comparison result.

In one embodiment of the present application, based on the foregoing scheme, the game module is configured to: retrieve a result structure corresponding to the result character from the structure library; compare the result position with the character structure diagram; and determine the comparison result as correct if the structural position corresponds to the character structure diagram, and wrong if the structural position does not correspond to the character structure diagram.

Those skilled in the art can understand that individual aspects of the present application may be implemented as systems, methods or program products. Accordingly, aspects of the present application may take the form of an entirely hardware embodiment, an entirely software embodiment (including firmware, micro-code, etc.,) or an embodiment combining software and hardware aspects that may all generally be referred to herein as a "circuit," "module" or "system."

An electronic device 1300 according to this embodiment of the present application will be described below with reference to FIG. 13. The electronic device 1300 shown in FIG. 13 is just an example and should not limit the scope of functions and application of the embodiments of the present application.

Figure 13:
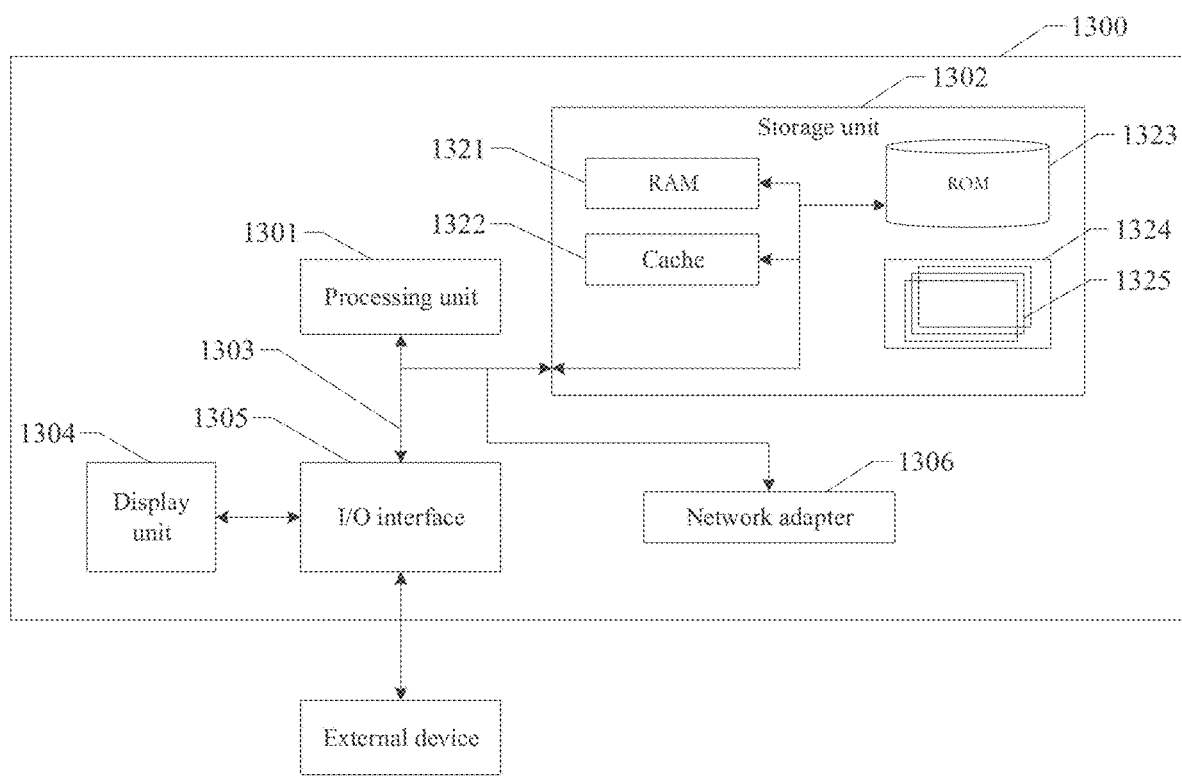
FIG. 13 is a hardware diagram of an electronic device according to an exemplary embodiment.

As shown in FIG. 13, the electronic device 1300 is in the form of a general-purpose computing device. Components of the electronic device 1300 may include but are not limited to: at least one processing unit 1301, at least one storage unit 1302, a bus 1303 connecting different components (including the storage unit 1302 and the processing unit 1301), and a display unit 1304.

Here, the storage unit stores program codes which may be executed by the processing unit 1301 to enable the processing unit 1301 to perform the steps according to various exemplary embodiments of the present application described in the "method embodiments" of this specification.

The storage unit 1302 may include a computer-readable medium in the form of a volatile memory, such as a random access memory (RAM) 1321 and/or a cache memory 1322, and may further include a read-only memory (ROM) 1323.

The storage unit 1302 may also comprise a program/ utility tool 1324 with a set of (at least one) program modules 1325, such program modules 1325 include but are not limited to: an operation system, one or more application programs, other program modules and program data, and each or some combinations of these examples may include the implementation of a network environment.

The bus 1303 may represent one or more of several types of bus structures, including a memory bus or a memory controller, a peripheral bus, an accelerated graphics port, a processing unit or a local bus using any of a variety of bus structures.

The electronic device 1300 may also communicate with one or more external devices (such as a keyboard, a pointing device, a Bluetooth device, etc.), one or more devices that enable users to interact with the electronic device 1300, and/or any device that enables the electronic device 1300 to communicate with one or more other computing devices (such as a router, a modem, etc.). This kind of communication can be done through an input/output (I/O) interface 1305. Furthermore, the electronic device 1300 may also communicate with one or more networks (such as a local area network (LAN), a wide area network (WAN), and/or a public network such as the Internet) through a network adapter 1306. As shown, the network adapter 1306 communicates with other modules of the electronic device 1300 through the bus 1303. It should be understood that although not shown in the figures, other hardware and/or software modules can be used in conjunction with the electronic device 1300, including but not limited to: microcode, a device driver, a redundant array of independent disks (RAID) system, a tape drive and a data backup storage system, etc.

From the above description of the embodiments, it is easy for those skilled in the art to understand that the exemplary embodiments described herein may be implemented in software or software combined with necessary hardware. Therefore, the technical schemes according to the embodiments of the present application may be embodied in the form of a software product, which may be stored in a non-volatile storage medium (which may be a CD-ROM, USB flash drive, mobile hard drive, etc.) or on a network, and may include several instructions to enable a computing device (which may be a personal computer, server, terminal device, or network device, etc.) to execute the method according to the embodiments of the present application.

According to one embodiment of the present application, there is also provided a computer-readable storage medium that stores a program product capable of implementing the method described above in the specification. In some possible embodiments, individual aspects of the application may also be embodied in the form of a program product including program code, which, when executed on a terminal device, causes the terminal device to perform the steps according to various exemplary embodiments of the present application described in the above "exemplary methods" section herein.

According to an embodiment of the present application, the program product for realizing the above method may be a portable compact disk read-only memory (CD-ROM) and comprise program codes, and can be run on a terminal device such as a personal computer. However, the program product of the present application is not limited to this. Herein, the readable storage medium may be any tangible medium containing or storing a program, which can be used by or in combination with an instruction execution system, apparatus or instrument.

The program product may use any combination of one or more computer-readable media. The computer-readable medium can be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations of the present application may be written in any combination of one or more programming languages, including an object-oriented programming language such as Java, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on a remote computer or server. In the latter scenario involving a remote computer, the remote computer may be connected to the user's computer through any type of network, including a local area network (LAN) or a wide area network (WAN), or the connection may be made to an external computer (for example, through the Internet using an Internet Service Provider).

In addition, the above drawings are only schematic illustrations of the processes included in the method according to the exemplary embodiments of the present application, and are not intended to be limiting. It is easy to understand that the processes shown in the above drawings do not indicate or limit a chronological order of these processes. In addition, it is also easy to understand that these processes may be executed synchronously or asynchronously, for example, in a plurality of modules.

It is to be understood that the present application is not limited to the precise structures described above and shown in the accompanying drawings, and modifications and changes can be made without departing from the scope of the present application. The scope of the present application is limited only by the appended claims.

What is claimed is:

1. A database generation method, comprising:
    acquiring an image of a Chinese character;
    determining, based on the image of the Chinese character, elementary components contained in the Chinese character and positions of the elementary components in the image of the Chinese character;
    determining position codes corresponding to the positions of the elementary components; and
    storing the elementary components and their corresponding position codes in a corresponding manner to obtain a component library of a database;
    wherein the step of determining position codes corresponding to the positions of the elementary components comprises:
    determining a position map corresponding to the Chinese character based on the positions of the elementary components in the image of the Chinese character, the position map being a square array diagram comprising at least two rows and two columns, the position map containing at least four structural positions, and the position codes being provided corresponding to the structural positions in the position map.

2. The database generation method of claim 1, after acquiring the image of the Chinese character, the method further comprising:
    acquiring a structure of the Chinese character;
    storing the structure of the Chinese character in a structure library of the database; and
    storing the Chinese character in a Chinese character library of the database.

3. The database generation method of claim 1, wherein the step of determining elementary components contained in the Chinese character comprises:
    segmenting the image of the Chinese character to obtain a plurality of Chinese character image segments;
    identifying elementary components corresponding to the Chinese character image segments; and
    taking the elementary components corresponding to the plurality of Chinese character image segments as the elementary components contained in the Chinese character.

4. The database generation method of claim 1, wherein the step of determining position codes corresponding to the positions of the elementary components further comprises:
    determining structural positions of the elementary components in the position map based on the positions of the elementary components in the image of the Chinese character; and
    taking the position codes of the structural positions corresponding to the elementary components as the position codes of the positions corresponding to the elementary components.

5. The database generation method of claim 4, before determining the position map corresponding to the Chinese character, the method further comprising:
    determining a map code of the position map;
    determining distinguishing codes of the position map for distinguishing the structural positions; and
    combining the map code with the distinguishing codes corresponding to the structural positions to obtain the position codes corresponding to the structural positions.

6. The database generation method of claim 5, wherein the step of determining a map code of the position map comprises:
    acquiring the number of rows or columns of the square array, and subtracting one from the number of rows or columns to obtain the map code; and
    the step of determining distinguishing codes of the position map for distinguishing the structural positions comprises:
    according to a sequence of the structural positions, encoding the structural positions with letters as the distinguishing codes of the structural positions.

7. The database generation method of claim 2, further comprising:
    acquiring a target stroke, retrieving candidate components containing the target stroke from the component library, and displaying the candidate components;
    in response to a component selection instruction to select a target component from the candidate components, displaying the target component, and displaying at least one position selection button for selecting a position of the target component;
    in response to a position selection instruction to select the position of the target component received through the at least one position selection button, retrieving a target structure containing the position of the target component from the structure library, retrieving candidate characters having the target structure and with the target component at the position of the target component from the Chinese character library, and displaying the candidate characters; and in response to a character selection instruction to select from the candidate characters a character to be retrieved, retrieving the character to be retrieved.

8. The database generation method of claim 7, wherein the step of acquiring a target stroke, retrieving candidate components containing the target stroke from the component library, and displaying the candidate components comprises:
in response to a retrieval instruction, acquiring basic strokes and displaying the basic strokes;
in response to a stroke selection instruction to select the target stroke from the basic strokes, acquiring the target stroke, and searching in the component library by using position codes corresponding to the candidate components containing the target stroke to obtain the candidate components containing the target stroke; and
displaying the candidate components.

9. The database generation method of claim 2, further comprising:
acquiring a character to be learned, and retrieving a target structure corresponding to the character to be learned from the structure library based on the character to be learned;
displaying the character to be learned, and displaying a character structure diagram corresponding to the target structure, the character structure diagram being configured to represent positions of a plurality of components of the character to be learned;
in response to a component selection instruction received through the character structure diagram, retrieving a component to be learned corresponding to the component selection instruction from the component library, and retrieving a component explanation corresponding to the component to be learned; and
displaying the component to be learned and the component explanation corresponding to the component to be learned.

10. The database generation method of claim 9, wherein the step of in response to a component selection instruction received through the character structure diagram, retrieving a component to be learned corresponding to the component selection instruction from the component library comprises:
in response to a component look-up instruction, acquiring a structure code corresponding to each component position in the character structure diagram; and
in response to a component selection instruction received through the structure code, determining the component to be learned corresponding to the component selection instruction, and retrieving the component to be learned corresponding to the component selection instruction from the component library.

11. An electronic device comprising a memory and a processor, wherein the memory stores a computer program which, when executed by the processor, enables implementation of the method of claim 1.

12. A non-transitory computer-readable storage medium, comprising computer program instructions which, when executed by a computer, cause the computer to carry out the method of claim 1.

13. A database generation method, comprising:
acquiring an image of a Chinese character;
determining, based on the image of the Chinese character, elementary components contained in the Chinese character and positions of the elementary components in the image of the Chinese character;
determining position codes corresponding to the positions of the elementary components; and
storing the elementary components and their corresponding position codes in a corresponding manner to obtain a component library of a database;
after acquiring the image of the Chinese character, the method further comprising:
acquiring a structure of the Chinese character;
storing the structure of the Chinese character in a structure library of the database; and
storing the Chinese character in a Chinese character library of the database;
wherein the method further comprises:
acquiring a character structure diagram and characters to be selected;
displaying the character structure diagram and the characters to be selected;
in response to a character selection instruction to select from the characters to be selected a result character, marking the result character corresponding to the character selection instruction, and displaying the result character in the character structure diagram; and
comparing the result character with a standard character to obtain and display a comparison result.

14. The database generation method of claim 13, wherein the step of comparing the result character with a standard character comprises:
retrieving a structural position corresponding to the result character from the structure library;
comparing the structural position with the character structure diagram; and
determining the comparison result as correct if the structural position corresponds to the character structure diagram, and wrong if the structural position does not correspond to the character structure diagram.

15. A database generation apparatus, comprising:
an acquisition module configured to acquire an image of a Chinese character;
a first determination module configured to determine, based on the image of the Chinese character, elementary components contained in the Chinese character and positions of the elementary components in the image of the Chinese character;
a second determination module configured to determine a position map corresponding to the Chinese character based on the positions of the elementary components in the image of the Chinese character, the position map being a square array diagram comprising at least two rows and two columns, the position map containing at least four structural positions, and the position codes being provided corresponding to the structural positions in the position map; determine structural positions of the elementary components in the position map based on the positions of the elementary components in the image of the Chinese character; and take the position codes of the structural positions corresponding to the elementary components as the position codes of the positions corresponding to the elementary components; and
a storage module configured to store the elementary components and their corresponding position codes in a corresponding manner to obtain a component library of a database;
wherein the acquisition module, the first determination module; the second determination module and the storage module are all hardware modules.

16. The database generation apparatus according to claim 15, the second determination module is further configured to determine a map code of the position map before determining the position map corresponding to the Chinese character; determine distinguishing codes of the position map for distinguishing the structural positions; and combine the map code with the distinguishing codes corresponding to the structural positions to obtain the position codes corresponding to the structural positions.

17. The database generation apparatus according to claim 16, the second determination module is further configured to acquire the number of rows or columns of the square array, and subtract one from the number of rows or columns to obtain the map code; and according to a sequence of the structural positions, encode the structural positions with letters as the distinguishing codes of the structural positions.

\* \* \* \* \*